(12) United States Patent
Fujishiro et al.

(10) Patent No.: US 11,856,112 B2
(45) Date of Patent: Dec. 26, 2023

(54) SYSTEM, SERVER DEVICE, AND STORAGE DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Mika Fujishiro, Kawasaki (JP); Yasuto Aramaki, Kawasaki (JP); Tatsuaki Iwata, Yokohama (JP); Hiromi Sakata, Suginami (JP); Taichiro Yamanaka, Yokohama (JP); Daisuke Mito, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 151 days.

(21) Appl. No.: 17/446,361

(22) Filed: Aug. 30, 2021

(65) Prior Publication Data
US 2022/0094557 A1 Mar. 24, 2022

(30) Foreign Application Priority Data
Sep. 18, 2020 (JP) ................. 2020-157427

(51) Int. Cl.
*H04L 9/32* (2006.01)
(52) U.S. Cl.
CPC ................. *H04L 9/3268* (2013.01)

(58) Field of Classification Search
CPC ..................................................... H04L 9/3268
See application file for complete search history.

(56) References Cited

U.S. PATENT DOCUMENTS

| | | | |
|---|---|---|---|
| 7,966,497 B2 | 6/2011 | Gantman et al. | |
| 8,195,713 B2 | 6/2012 | Miyazaki et al. | |
| 9,363,085 B2* | 6/2016 | Offenberg | ............... G06F 21/64 |
| 9,716,594 B2 | 7/2017 | Offenberg et al. | |

(Continued)

FOREIGN PATENT DOCUMENTS

| | | |
|---|---|---|
| JP | 4493677 B2 | 6/2010 |
| JP | 4680505 B2 | 5/2011 |

(Continued)

*Primary Examiner* — Carl G Colin
*Assistant Examiner* — Hany S. Gadalla
(74) *Attorney, Agent, or Firm* — Allen & Overy LLP

(57) ABSTRACT

According to one embodiment, a server device includes a memory and a processor. The memory stores verification information. The processor accepts a request to transmit a certificate number, generates information in which identification information of one of storage devices from which data is to be erased, a public key, a secret key, and the certificate number are associated with one another, transmits the certificate number, performs verification using an authenticator transmitted by the one storage device and verification information, generates, based on a result of the verification, an erasure certificate that includes the identification information and the certificate number and is signed using the secret key, and transmits the erasure certificate.

13 Claims, 6 Drawing Sheets

(56) References Cited

U.S. PATENT DOCUMENTS

| | | | | |
|---|---|---|---|---|
| 2015/0358321 A1* | 12/2015 | Udagawa | ............. | H04L 63/126 |
| | | | | 713/176 |
| 2017/0093570 A1* | 3/2017 | Maruyama | ............ | H04L 63/045 |
| 2021/0223968 A1* | 7/2021 | Umesawa | ............ | H04L 9/3247 |

FOREIGN PATENT DOCUMENTS

| | | | |
|---|---|---|---|
| JP | 5127489 B2 | | 1/2013 |
| JP | 2018-139025 A | | 9/2018 |
| JP | 2021174132 A | * | 11/2021 |

* cited by examiner

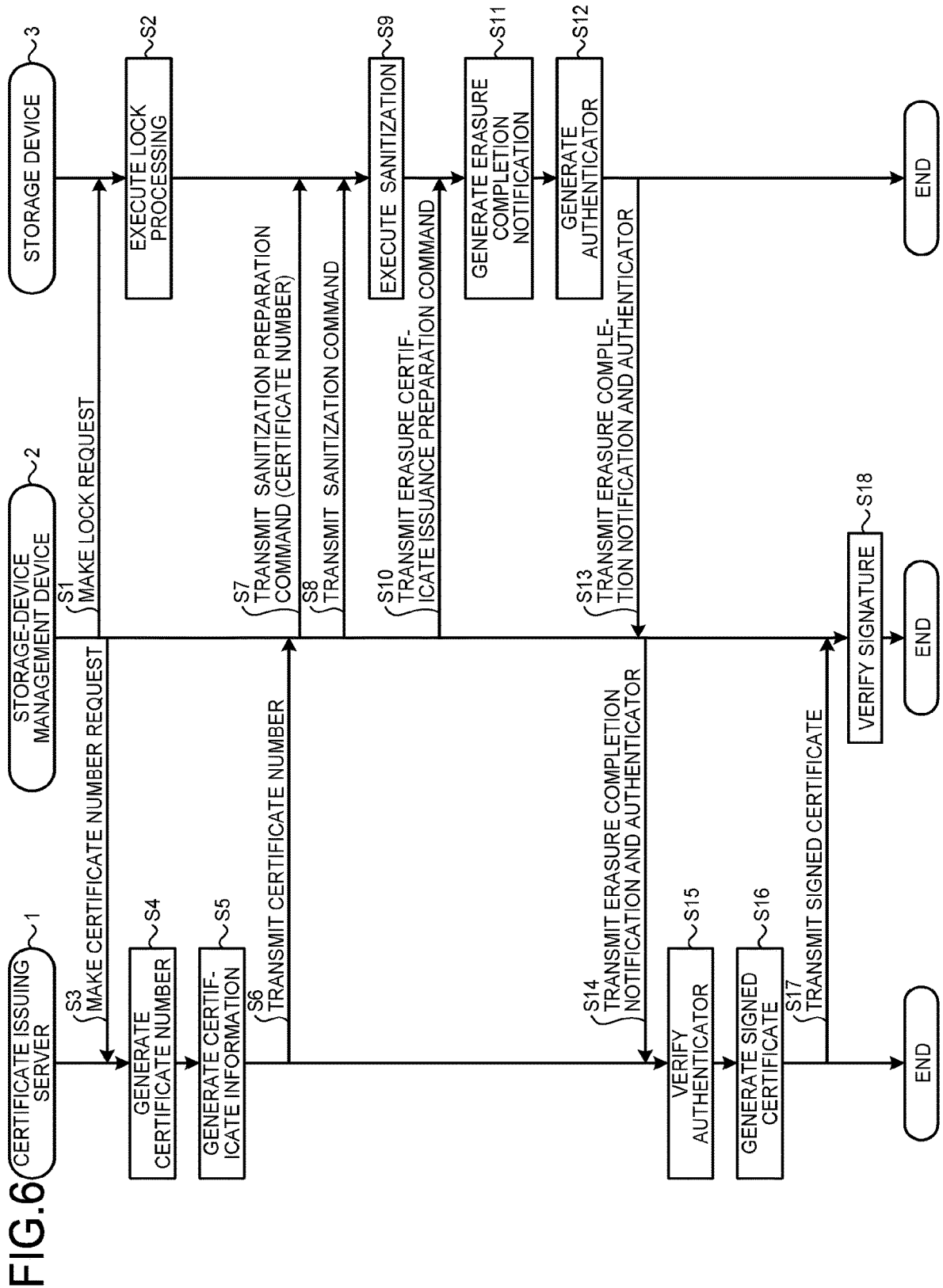

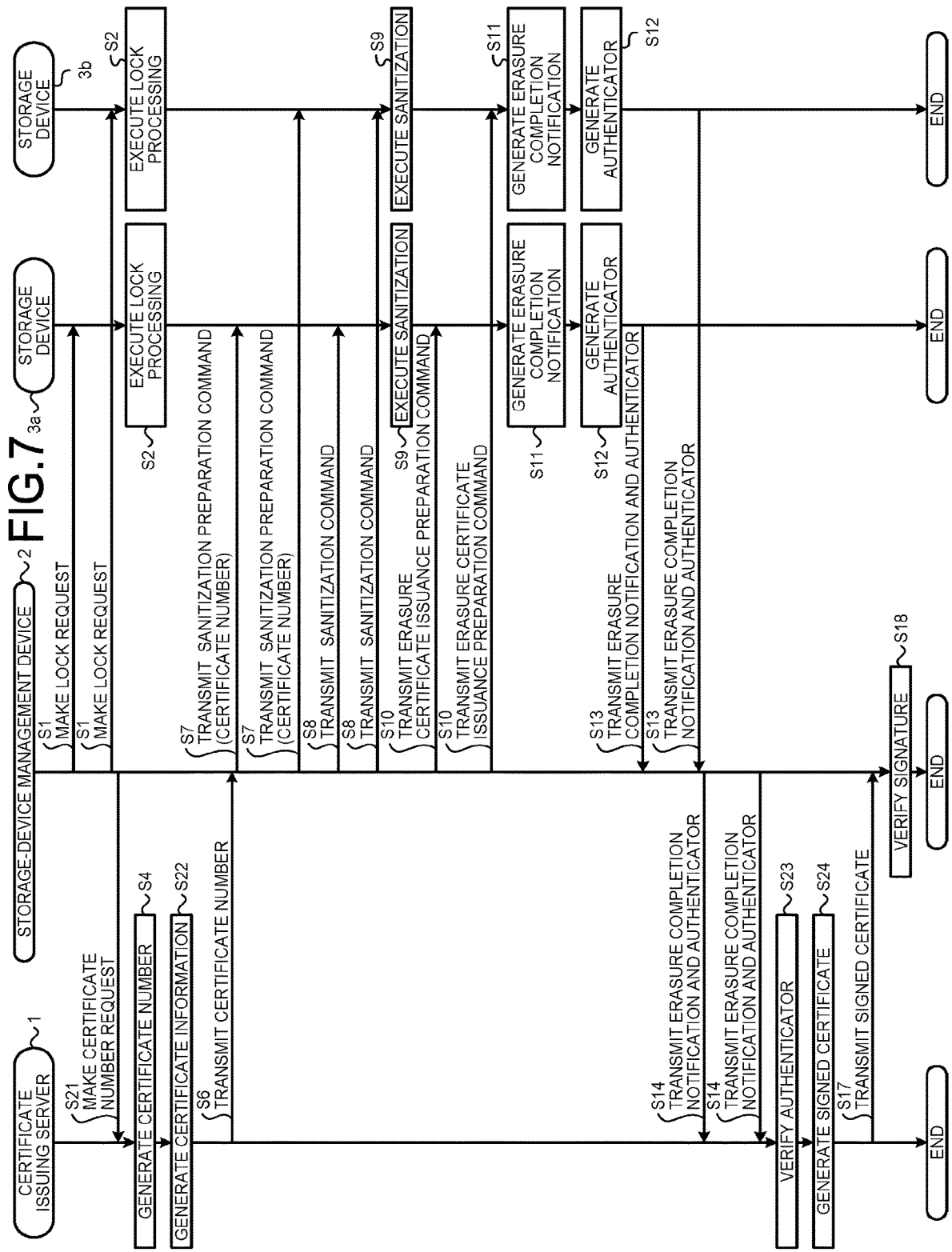

SYSTEM, SERVER DEVICE, AND STORAGE DEVICE

CROSS-REFERENCE TO RELATED APPLICATIONS

This application is based upon and claims the benefit of priority from Japanese Patent Application No. 2020-157427, filed on Sep. 18, 2020; the entire contents of which are incorporated herein by reference.

FIELD

Embodiments described herein relate generally to a system, a server device, and a storage device.

BACKGROUND

There is a technology of issuing an erasure certificate by a storage device or the like in order to prove that data in the storage device has been erased. Such an erasure certificate is desired to have high reliability.

BRIEF DESCRIPTION OF THE DRAWINGS

FIG. 6 is a sequence diagram illustrating an operation of the system according to the first embodiment; and FIG. 7 is a sequence diagram illustrating an operation of a system according to a second embodiment.

DETAILED DESCRIPTION

According to one embodiment, a system includes storage devices and a server device. The server device includes a first memory and a first processor. The first memory stores first verification information. The first processor is configured to: accept a request to transmit a certificate number; generate information in which identification information of one of the storage devices from which data is to be erased, a public key, a secret key, and the certificate number are associated with one another; transmit the certificate number; perform verification using an authenticator transmitted by the one storage device and the first verification information; generate, based on a result of the verification result, an erasure certificate that includes an erasure completion notification transmitted by the one storage device and is signed by using the secret key; and transmit the erasure certificate. Each of the storage devices includes a second memory and a second processor. The second memory stores second verification information corresponding to the first verification information, and the second processor is configured to: erase the data; and transmit the erasure completion notification including the certificate number transmitted by the server device and the identification information, and the authenticator generated by using the second verification information.

Hereinafter, a system, a server device, and a method according to embodiments will be described in detail with reference to the accompanying drawings. Note that the present disclosure is not limited to the following embodiments.

First Embodiment

Figure 1:
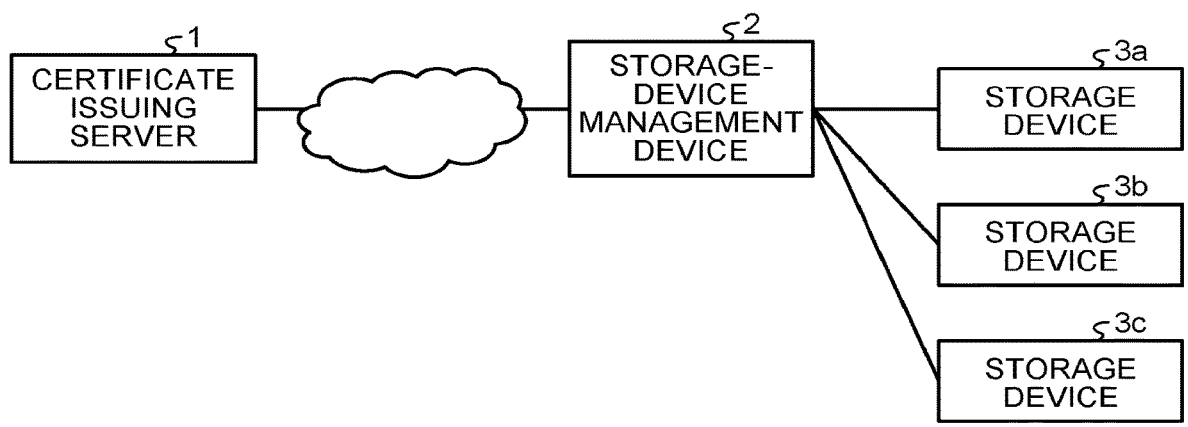
FIG. 1 is a block diagram illustrating a configuration of a system according to a first embodiment.

FIG. 1 is a block diagram illustrating a configuration of a system according to a first embodiment. The system according to the present embodiment includes a certificate issuing server 1, a storage-device management device 2, and a storage device 3. The storage-device management device 2 is a server device capable of outputting an instruction to erase data stored in the storage device 3 (storage devices 3*a*, 3*b*, and 3*c*).

The certificate issuing server 1 is a server device that generates information necessary for generating an erasure certificate and issues the erasure certificate based on the information.

The storage-device management device 2 transmits an erasure instruction for instructing erasure processing of data in the storage device 3 to the storage device 3 by a serial attached small computer system (SAS)/serial advanced technology attachment (SATA) interface or the like. The storage device 3 erases the data stored therein in response to the erasure instruction.

The certificate issuing server 1 and the storage-device management device 2 can transmit and receive information to and from each other via a network such as a public line. Information transmission and reception processing between the storage-device management device 2 and the certificate issuing server 1 may be realized by executing dedicated software created by a device manufacturer. In addition, information may be transmitted and received by transmitting and receiving mails between the certificate issuing server 1 and the storage-device management device 2.

In addition, the certificate issuing server 1 may register and hold information of the storage-device management device 2 and a device administrator in advance, perform identification and authentication as necessary, and provide a certificate issuing service only when the authentication is successfully performed.

Figure 2:
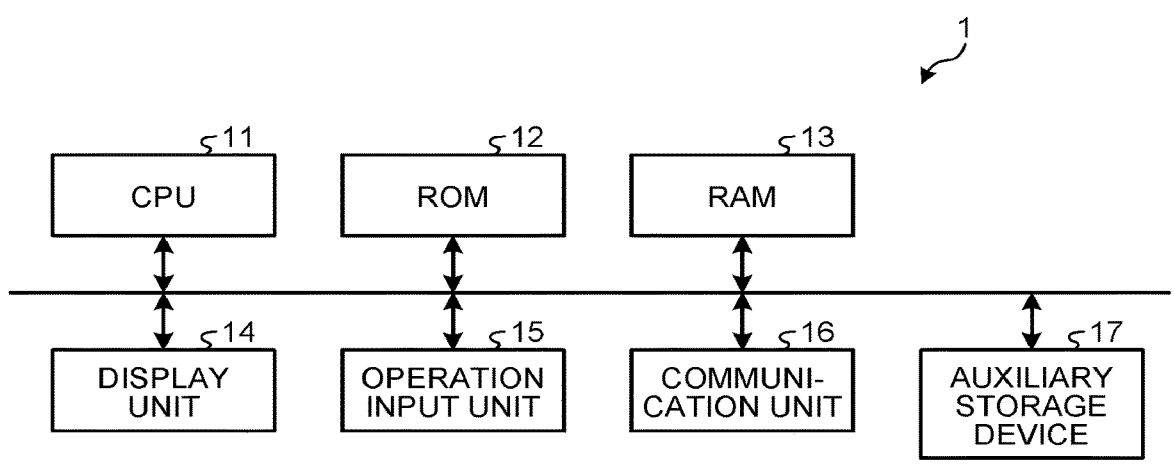
FIG. 2 is a block diagram illustrating a hardware configuration of a certificate issuing server 1 according to the first embodiment.

FIG. 2 is a block diagram illustrating a hardware configuration of the certificate issuing server 1 according to the first embodiment. The certificate issuing server 1 includes a server device, a personal computer (PC), and the like. The certificate issuing server 1 includes a central processing unit (CPU) 11, a read only memory (ROM) 12, a random access memory (RAM) 13, a display unit 14, an operation input unit 15, a communication unit 16, and an auxiliary storage device 17.

The CPU 11 executes a program stored in advance in the ROM 12 to control an operation of each unit included in the certificate issuing server 1. The ROM 12 stores various types of information such as a program related to control of the certificate issuing server 1. The RAM 13 functions as a work area of the CPU 11.

The display unit 14 includes, for example, a liquid crystal display (LCD) or the like, and displays various types of information. Furthermore, the display unit 14 may be a touch panel display capable of detecting a touch operation on a screen. The operation input unit 15 includes, for example, a mouse, a keyboard, and the like, and a user can input various types of information. The communication unit 16 can communicate with an external device such as the storage-device management device 2 via a network (not illustrated). The auxiliary storage device 17 is a memory card, a hard disk drive (HDD), or the like. The auxiliary storage device 17 stores various types of information.

Figure 3:
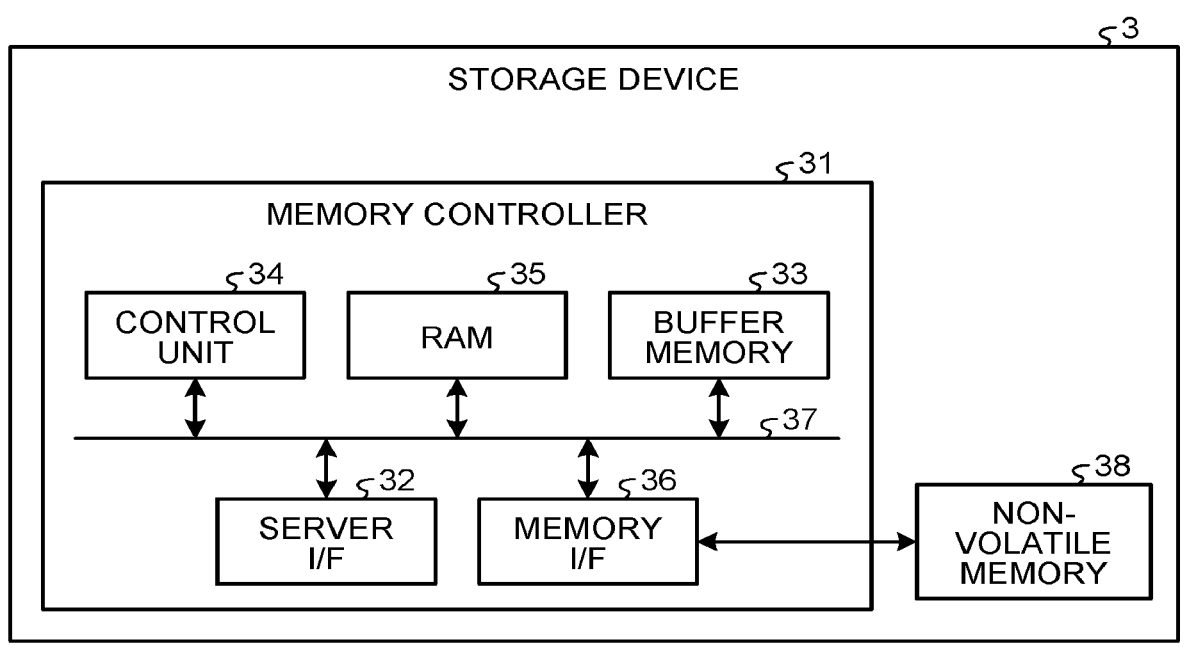
FIG. 3 is a block diagram illustrating a hardware configuration of a storage device 3 according to the first embodiment.

FIG. 3 is a block diagram illustrating a hardware configuration of the storage device 3 according to the first embodiment. The storage device 3 can be connected to the storage-device management device 2 via a communication medium (for example, a serial cable), and can function as an external storage apparatus for the storage-device management device 2. The storage device 3 is, for example, a solid state drive (SSD). The storage device 3 includes a memory controller 31 and a nonvolatile memory 38.

The nonvolatile memory 38 is a memory that stores data in a nonvolatile manner, and is, for example, a NAND flash memory (hereinafter, it is simply referred to as a NAND memory). In the following description, a case where a NAND memory is used as the nonvolatile memory 38 will be exemplified. As the nonvolatile memory 38, a storage medium such as a three-dimensional structure flash memory, a resistive random access memory (ReRAM), a ferroelectric random access memory (FeRAM), or a magnetoresistive random access memory (MRAM) can also be used. Further, the nonvolatile memory 38 is not necessarily a semiconductor memory, and the present embodiment can be applied to various storage media.

The memory controller 31 is, for example, a semiconductor integrated circuit configured as a system-on-a-chip (SoC). The memory controller 31 controls write processing to the nonvolatile memory 38 in accordance with a write request from the storage-device management device 2. In addition, the memory controller 31 controls read processing from the nonvolatile memory 38 in accordance with a read request from the storage-device management device 2. The memory controller 31 includes a server interface (I/F) 32, a buffer memory 33, a control unit 34, a random access memory (RAM) 35, and a memory interface (I/F) 36.

The server interface (I/F) 32, the buffer memory 33, the control unit 34, the random access memory (RAM) 35, and the memory interface (I/F) 36 are mutually connected via an internal bus 37.

Each function in the memory controller 31 may be entirely realized by dedicated hardware, or each function may be entirely realized by a processor that executes firmware. Alternatively, a part of each function in the memory controller 31 may be realized by dedicated hardware, and the rest may be realized by a processor that executes firmware.

The server I/F 32 is an interface that outputs a write request and a read request from the storage-device management device 2, user data, and the like to the internal bus 37. The server I/F 32 is, for example, an SAS/SATA interface. In addition, the server I/F 32 transmits user data read from the nonvolatile memory 38, a response from the control unit 34, and the like to the storage-device management device 2.

The buffer memory 33 temporarily stores written user data, read user data, internal management data, and the like. The buffer memory 33 can be configured by, for example, a dynamic random access memory (dynamic RAM, including a synchronous DRAM (SDRAM)) or a static RAM (SRAM).

The control unit 34 integrally controls the storage device 3. The control unit 34 includes, for example, a CPU and a micro processing unit (MPU). When receiving a request from the storage-device management device 2 via the server I/F 32, the control unit 34 instructs the memory I/F 36 to perform control according to the request.

The RAM 35 is, for example, a semiconductor memory such as an SRAM, and is used as a working memory of the control unit 34. Various management tables such as firmware for managing the nonvolatile memory 38 and an address conversion table are loaded into the RAM 35 as necessary.

The memory I/F 36 executes write processing, read processing, and erasure processing of data and the like on the nonvolatile memory 38 based on an instruction from the control unit 34.

Figure 4:
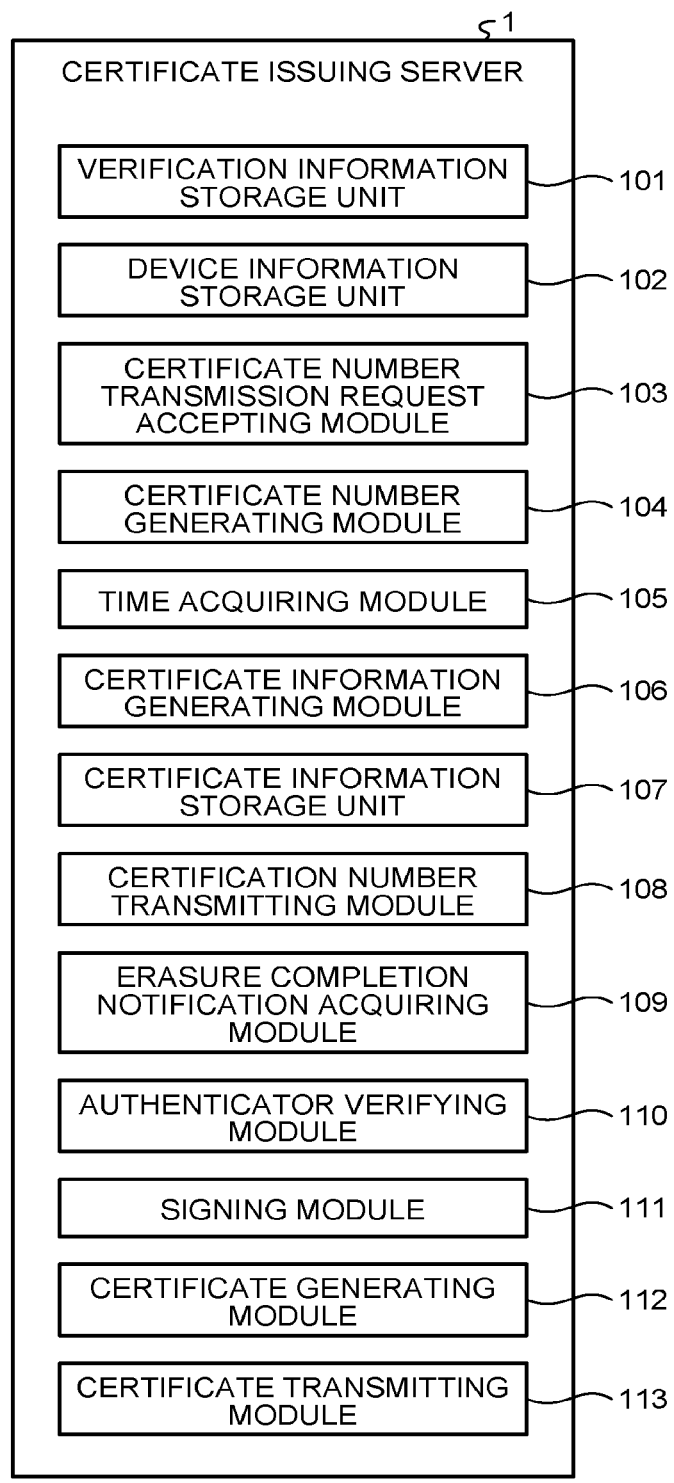
FIG. 4 is a block diagram illustrating an example of a functional configuration of the certificate issuing server 1 according to the first embodiment.

FIG. 4 is a block diagram illustrating an example of a functional configuration of the certificate issuing server 1 according to the first embodiment. The certificate issuing server 1 includes a verification information storage unit 101, a device information storage unit 102, a certificate number transmission request accepting module 103 (acceptance unit), a certificate number generating module 104, a time acquiring module 105, a certificate information generating module 106 (information generating module), and a certificate information storage unit 107. In addition, the certificate issuing server 1 includes a certificate number transmitting module 108, an erasure completion notification acquiring module 109, an authenticator verifying module 110 (verifying module), a signing module 111, a certificate generating module 112, and a certificate transmitting module 113. The verification information storage unit 101, the device information storage unit 102, and the certificate information storage unit 107 are implemented by, for example, the auxiliary storage device 17. Components other than the storage units are implemented by the CPU 11 executing a program stored in the ROM 12.

The verification information storage unit 101 stores verification information. The verification information is a common key or the like that is a value common between the certificate issuing server 1 and the storage device 3, a public key or the like that is a corresponding value between the certificate issuing server 1 and the storage device 3, or the like. The verification information storage unit 101 stores identification information of the storage device 3 and the verification information in association with each other. The identification information is, for example, a serial number of the storage device 3.

The device information storage unit 102 stores information of the storage device 3. The device information storage unit 102 stores the identification information of the storage device 3 and manufacturer information.

The certificate number transmission request accepting module 103 accepts a certificate number transmission request from the storage-device management device 2. In addition, the certificate number transmission request accepting module 103 acquires the identification information of the storage device 3 from which data is to be erased at a time of acceptance of the request. Here, the certificate number is a number for identifying a certificate, and is a number that is difficult to predict based on a random number or the like. Therefore, it is desirable that the certificate number has a sufficient number of digits.

The certificate number generating module 104 generates a certificate number. When the certificate number transmission request is accepted, the certificate number generating module 104 generates a certificate number using a random number or the like.

The time acquiring module 105 acquires an acceptance time. The time acquiring module 105 acquires time information managed by the certificate issuing server 1 or time information from a time management server (not illustrated) that manages accurate time.

The certificate information generating module 106 generates certificate information including identification information of the storage device 3 from which data is to be erased, a public key, a secret key, and a certificate number. When the certificate number transmission request is accepted, the certificate information generating module 106 acquires current time information as the acceptance time from the time acquiring module 105. In addition, the certificate information generating module 106 generates a public key and a secret key.

Then, the certificate information generating module 106 generates the certificate information in which the identification information of the storage device 3 from which data is to be erased, the public key, the secret key, the certificate number, and the acceptance time are associated with each other. The certificate information storage unit 107 stores the certificate information generated by the certificate information generating module 106.

The certificate number transmitting module 108 transmits the certificate number to the storage-device management device 2.

The erasure completion notification acquiring module 109 acquires an erasure completion notification and an authenticator generated by the storage device 3. Information included in the erasure completion notification includes a certificate number, device identification information, and an erasure location. In addition, the authenticator is information using verification information held by the storage device 3, and is, for example, information using a signature technology such as keyed message authentication code (MAC) such as hash-based MAC (HMAC) or RSA.

The storage device 3 transmits, to the storage-device management device 2, the erasure completion notification and the authenticator generated after the erasure processing. Then, the storage-device management device 2 transmits the erasure completion notification and the authenticator to the certificate issuing server 1. Accordingly, the erasure completion notification acquiring module 109 acquires the erasure completion notification and the authenticator.

The authenticator verifying module 110 verifies whether the erasure completion notification is appropriate, using the acquired authenticator and the verification information stored in the verification information storage unit 101. The authenticator verifying module 110 performs, for example, MAC verification.

The signing module 111 generates signature information by a signature method such as RSA using the secret key stored in the certificate information storage unit 107.

The certificate generating module 112 creates an erasure certificate including an erasure completion notification. When the authenticator verifying module 110 determines that the erasure completion notification is appropriate, the certificate generating module 112 generates an erasure certificate including information included in the erasure completion notification, an acceptance time of the certificate information, and the signature information.

The certificate information generating module 106 generates the certificate information including the acceptance time. The acceptance time is a time before the erasure processing by the storage device 3. As described above, the certificate generating module 112 can guarantee that the data before the acceptance time is erased by including the acceptance time in the erasure certificate. That is, the acceptance time is an erasure guarantee time. Unlike a general storage device not connected to a network, the certificate issuing server 1 can acquire and record an accurate acceptance time, and can output a more appropriate erasure certificate.

Note that the certificate generating module 112 may include the acceptance time acquired from the time acquiring module 105 in the erasure certificate as a certificate issuance time. In this case, the certificate generating module 112 can generate an erasure certificate with which the erasure time can be easily recognized. In addition, the certificate generating module 112 may include various types of information regarding the manufacturer of the storage device 3 in the erasure certificate.

In this case, the erasure certificate includes a certificate number, device identification information, an erasure location, an erasure guarantee time, a certificate issuance time, manufacturer information, and signature information.

The certificate transmitting module 113 transmits the erasure certificate to the storage-device management device 2.

Figure 5:
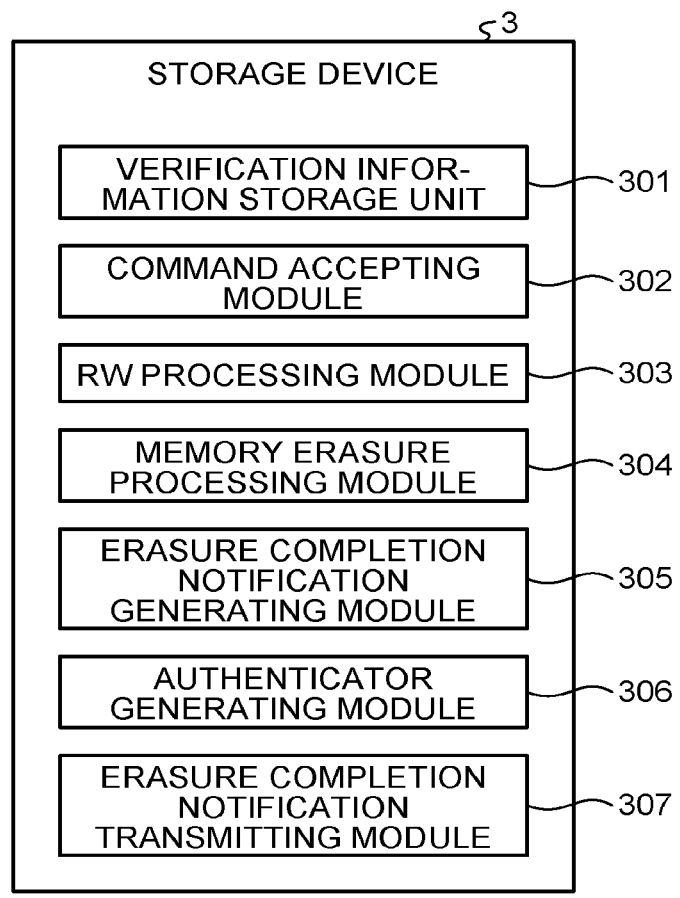
FIG. 5 is a block diagram illustrating an example of a functional configuration of the storage device 3 according to the first embodiment.

FIG. 5 is a block diagram illustrating an example of a functional configuration of the storage device 3 according to the first embodiment. The storage device 3 includes a verification information storage unit 301 (device-side verification information storage unit), a command accepting module 302, an read/write (RW) processing module 303, a memory erasure processing module 304 (erasing module), an erasure completion notification generating module 305, an authenticator generating module 306, and an erasure completion notification transmitting module 307 (transmitting module).

The verification information storage unit 301 stores verification information. The verification information is information common to the verification information stored in the certificate issuing server 1, a secret key corresponding to the public key of the verification information stored in the certificate issuing server 1, or the like. The verification information storage unit 301 is realized by, for example, the RAM 35 and the nonvolatile memory 38.

The command accepting module 302 accepts various commands transmitted from the storage-device management device 2. The command accepting module 302 is realized by the control unit 34 accepting various commands via the server I/F 32.

The RW processing module 303 performs processing related to a read command or a write command. In addition, the RW processing module 303 performs write lock processing as processing related to the write command. The RW processing module 303 is realized by the control unit 34 issuing an instruction to the memory I/F 36 according to a command.

When accepting an erase command (erase instruction), the memory erasure processing module 304 erases data stored in nonvolatile memory 38. The memory erasure processing module 304 may perform sanitization processing as the erasure processing. In addition, the memory erasure processing module 304 may overwrite dummy data or erase a data encryption key as the erasure processing. In addition, the memory erasure processing module 304 may perform the erasure processing on a designated erasure range. The memory erasure processing module 304 is realized by the control unit 34 issuing an instruction to the memory I/F 36 according to a command.

The erasure completion notification generating module 305 generates information including the erasure certificate number, the identification information of the storage device 3, and the information indicating an erasure location as the erasure completion notification. The erasure completion notification generating module 305 is realized by the control unit 34.

The authenticator generating module 306 generates an authenticator by a signature technology of keyed MAC or RSA by using the verification information. The authenticator generating module 306 is realized by the control unit 34.

The erasure completion notification transmitting module 307 transmits the erasure completion notification and the authenticator to the storage-device management device 2. The erasure completion notification transmitting module 307 is realized by the control unit 34 transmitting information via the server I/F 32.

Next, operations of the certificate issuing server 1, the storage-device management device 2, and the storage device 3 will be described with reference to FIG. 6. FIG. 6 is a sequence diagram illustrating an operation of the system according to the first embodiment. Here, the sanitization processing is performed as the erasure processing. First, the storage-device management device 2 makes a write lock request to the storage device 3 that executes the sanitizing process (S1). The storage device 3 accepts a command of write lock, and executes the write lock (S2). When a lock range is determined, the storage device 3 performs write lock on the lock range. The command of write lock is assumed to be a function of a trusted computing group (TCG), a special command provided by a device vendor, or the like.

The storage device 3 performs write lock to prevent the write processing from being performed between generation of the certificate number by the certificate issuing server 1 and the sanitization processing. It is assumed that the write lock is released when sanitization is completed or when the storage-device management device 2 issues a write lock release instruction. Even when the storage-device management device 2 does not request the write lock, the storage device 3 can automatically perform the write lock according to a command issued in S7 described later.

The storage-device management device 2 transmits to the certificate issuing server 1 the identification information of the storage device 3 from which data is to be erased and makes a certificate number transmission request (S3). The certificate issuing server 1 generates a certificate number based on a random number or the like (S4). The certificate issuing server 1 acquires an acceptance time, generates a public key and a secret key, and generates certificate information in which the certificate number, the acceptance time, the public key, and the secret key are associated with each other (S5).

Note that the certificate issuing server 1 may generate the public key and the secret key every time in response to accepting the certificate number transmission request, may make the public key and the secret key different for each storage device 3, or may make the public key and the secret key different for each device administrator. In addition, the public key and the secret key may be changed one by one as necessary. Since the certificate issuing server 1 generates, manages, uses the public key and the secret key and distributes the public key to all the storage devices 3 and all the device administrators, the certificate issuing server 1 can flexibly operate the public key and the secret key.

The certificate issuing server 1 may generate a public key and a secret key common to the storage devices 3 managed by the same device administrator. That is, the certificate issuing server 1 may generate a public key and a secret key common in a predetermined unit (for example, a device administrator). As a result, the public key and the secret key can be easily managed.

The certificate issuing server 1 transmits the generated certificate number to the storage-device management device 2 (S6). The storage-device management device 2 transmits the certificate number to a corresponding one of the storage devices 3 and transmits a sanitization preparation command (S7). Then, the storage device 3 holds the acquired certificate number. The storage device 3 may execute write lock in response to the sanitization preparation command.

Subsequently, the storage-device management device 2 transmits a sanitization command to the storage device 3 (S8). Note that the storage device 3 accepts the sanitization command only when the sanitization command is transmitted within a predetermined period after accepting the sanitization preparation command. When accepting the sanitization command, the storage device 3 executes the sanitization processing (S9).

As the sanitization command and the sanitization preparation command, a normal set of sanitization commands such as Security Erase Unit and Security Erase Prepare of ATA is assumed. In a case where the sanitization preparation command has a specification in which the certificate number cannot be transmitted, it is assumed that a device vendor defines a special command for transmitting the certificate number as an alternative sanitization preparation command or a command transmitted before the alternative sanitization preparation command.

The storage-device management device 2 transmits an erasure certificate issuance preparation command to the storage device 3 in order to request a guarantee by the manufacturer of the storage device 3 that has performed the sanitization (S10). The erasure certificate issuance preparation command is a command for requesting information necessary for issuing an erasure certificate. However, in a case where the above procedure has not been performed (for example, in a case where a sanitization command is not issued, or the like) or in a case where the sanitization has not been successful, the storage device 3 does not accept the erasure certificate issuance preparation command.

The storage device 3 generates information including the erasure certificate number, the identification information, and the information including information indicating the erasure location as the erasure completion notification (S11). In addition, the storage device 3 generates an authenticator using the verification information (S12). By performing verification using the authenticator, the system according to the present embodiment can appropriately verify that the sanitization has been performed even when an entity (the certificate issuing server 1) that certifies the completion of sanitization is at a point physically different from a sanitization execution entity (the storage device 3), and the completion of sanitization cannot be directly confirmed or a communication path is not reliable.

The storage device 3 adds the authenticator to the erasure completion notification and transmits the erasure completion notification to the storage-device management device 2 (S13). The storage-device management device 2 transmits the erasure completion notification and the authenticator as they are to the certificate issuing server 1 (S14). Note that, in a case where the erasure completion notification cannot be acquired for a certain period or more after a certificate number request is accepted, the certificate issuing server 1 may time out and end the processing. Note that, at the time of timeout, the certificate issuing server 1 may notify the storage-device management device 2 from which the above certificate number request is made of the timeout. In this case, in order for the certificate issuing server 1 to issue the erasure certificate, it is necessary to perform processing again from the processing of S1.

The certificate issuing server 1 performs verification using the authenticator and the stored verification information (S15). When the verification of the authenticator fails, the certificate issuing server 1 ends the processing without generating an erasure certificate. When a result of the verification of the authenticator is correct, this means that the erasure completion notification is not falsified or forged in the middle of transmission of the authenticator or the like from the storage device 3, but is a formal erasure completion notification from the storage device 3.

The certificate issuing server 1 generates an erasure certificate including the information included in the erasure completion notification, the erasure guarantee time, and the signature information (S16). The certificate issuing server 1 transmits the erasure certificate to the storage-device management device 2 (S17). The storage-device management device 2 verifies a signature of the received erasure certificate using the public key, and utilizes the erasure certificate (S18). The storage-device management device 2 acquires the public key by a known method such as using the Web, and then verifies the signature.

Through the series of processing, the device manufacturer can grasp, analyze, and utilize how its own product is used, and based on that, the device manufacturer may transmit information to be proposed and developed to its customer together with the erasure certificate as necessary. In the present system, since confirmation of completion of sanitization, and creation, signature, and distribution of a certificate are realized by the certificate issuing server 1 provided by or entrusted to the device manufacturer as a base of trust, reliability of the erasure certificate can be enhanced.

In the above-described embodiment, the case has been described where the storage device 3 generates the authenticator and the erasure completion notification after accepting the erasure certificate issuance preparation command. However, the authenticator and the erasure completion notification may be generated after sanitization and before issuing the erasure certificate issuance preparation command.

In the system according to the first embodiment, the certificate issuing server 1 stores the verification information, generates the erasure certificate information when accepting the certificate number transmission request, and transmits the certificate number. In addition, the certificate issuing server 1 performs verification using the authenticator transmitted by the storage device 3 and the stored verification information. When a result of the verification is appropriate, the certificate issuing server 1 generates the erasure certificate including the erasure completion notification transmitted by the storage device 3 and signed using the secret key.

In addition, the storage device 3 stores the verification information corresponding to the verification information stored in the certificate issuing server 1, erases data in response to the sanitization command from the storage-device management device 2, and transmits the erasure completion notification including the certificate number and the identification information of the storage device 3 and the authenticator using the verification information.

As described above, the certificate issuing server 1 verifies the authenticator generated using the verification information stored in the storage device 3 (information corresponding to the verification information of the certificate issuing server 1), thereby accurately determining whether the erasure completion notification transmitted by the storage device 3 is appropriate.

For example, since there is a possibility that the storage-device management device 2 is infected with malware and there is a possibility that a malicious user who logs in as a person in charge of managing and operating the storage-device management device 2 tries to forge or falsify the erasure completion notification, there is a case where the communication path or the like is not necessarily reliable. However, since the certificate issuing server 1 performs verification using the authenticator, it is possible to output an erasure certificate with high reliability.

In addition, the certificate issuing server 1 manages, and transmits and receives information necessary for issuing an erasure certificate by using a certificate number that is an unpredictable random number value. As a result, in the system according to the first embodiment, even if a device that performs erasure and a device that performs signature are different in location and direct communication is not possible, the manufacturer can guarantee data erasure through a relatively small amount of information and a simple procedure. In addition, by using the certificate issuing server 1 provided by a storage device manufacturer or an equivalent organization instead of the storage device itself using a public timestamp service, it is possible to easily adopt a method of using a common key such as an HMAC for an authenticator to be added to the erasure completion notification.

Second Embodiment

In a second embodiment, an example of collectively erasing a plurality of storage devices 3 will be described. Hereinafter, portions different from those of the first embodiment will be mainly described. Here, a case where two storage devices 3 are collectively erased will be described, but the same applies to a case where three or more storage devices 3 are collectively erased. FIG. 7 is a sequence diagram illustrating an operation of a system according to the second embodiment.

Processing contents of step numbers in FIG. 7 common to those in FIG. 6 are common to processing contents described in the first embodiment. In addition, as a premise, it is assumed that a public key and a secret key corresponding to the storage devices 3 (the storage device 3a and the storage device 3b) under the storage-device management device 2 are common. In addition, verification information of the storage device 3a and the storage device 3b may be common or different.

After making lock requests (S1) to the storage devices 3 a and 3 b, the storage-device management device 2 transmits identification information of each of the storage devices 3 to the certificate issuing server 1 and makes a single certificate number transmission request (S21). That is, the storage-device management device 2 requests to put together erasure certificates for the storage devices 3a and 3b. The storage-device management device 2 needs to transmit all the identification information of the storage devices 3 that needs to be included in a same erasure certificate, and cannot change the certificate number after the certificate issuing server 1 issues the certificate number.

After S4, the certificate issuing server 1 generates certificate information (S22). Similarly to S5 of FIG. 6, the certificate issuing server 1 generates the certificate information in which the certificate number, current time information, the public key, and the secret key are associated with each other, but associates identification information of two storage devices 3 with a single certificate number. That is, the certificate information includes identification information of the two storage devices 3.

After S6, the storage-device management device 2 and each of the storage devices 3 perform the processing of S7 to S13 in FIG. 6. Then, the storage-device management device 2 transmits the erasure completion notification and the authenticator of each storage device 3 to the certificate issuing server 1 (S14).

After confirming that the erasure completion notification and the authenticator from each of the two storage devices 3 associated with the certificate number of the certificate information have been received, the certificate issuing server 1 verifies each authenticator (S23). In a case where even one erasure completion notification cannot be received from the storage devices 3 for a certain period, the certificate issuing server 1 considers that the certificate issuance has failed and notifies the storage-device management device 2 that has made a single certificate number transmission request of the fact of the certificate issuance failure, and ends the processing. In this case, in order for the certificate issuing server 1 to issue the erasure certificate, it is necessary to perform processing again from the processing of S1.

When verification of the authenticators for the two storage devices 3 is successful, the certificate issuing server 1 generates an erasure certificate including the information included in the erasure completion notification, the erasure guarantee time, and the signature information (S24). The certificate issuing server 1 transmits the erasure certificate to the storage-device management device 2 (S17). The erasure certificate includes the identification information of the two storage devices 3 for a single certificate number.

According to the certificate issuing server 1 according to the second embodiment, since erasure certificates of the plurality of storage devices 3 are integrated into one, issuance cost (data amount or the like) can be reduced. In addition, since the certificate issuing server 1 shares the public key and the secret key corresponding to the storage devices 3 managed by the same storage-device management device 2, signature generation cost can be reduced. Furthermore, signature verification processing cost by the storage-device management device 2 can also be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
    storage devices; and
    a server device,
    the server device comprising:
    a first memory storing first verification information; and
    a first processor configured to:
        accept a request to transmit a certificate number indicating a number for identifying an erasure certificate;
        generate information in which identification information of one of the storage devices from which data is to be erased, a public key, a secret key, and the certificate number are associated with one another;
        transmit the certificate number;
        verify whether an erasure completion notification transmitted by the one storage device is appropriate by using an authenticator transmitted by the one storage device and the first verification information;
        generate, in response to the erasure completion notification being appropriate, the erasure certificate that includes the erasure completion notification transmitted by the one storage device and is signed by using the secret key; and
        transmit the erasure certificate, and
    each of the storage devices comprising:
    a second memory storing second verification information corresponding to the first verification information; and
    a second processor configured to:
        erase the data; and
        transmit the erasure completion notification including the certificate number transmitted by the server device and the identification information, and the authenticator generated by using the second verification information.

2. The system according to claim 1, wherein the first processor is configured to generate the erasure certificate further including a time based on a time at which the request to transmit the certificate number is made.

3. The system according to claim 2, wherein the first processor is configured to generate the erasure certificate that further includes a time at which the erasure certificate is generated.

4. The system according to claim 1, wherein
    when a request is made to put together two or more storage devices to be erased of the storage devices, the first processor is configured to:
    generate information in which identification information of the two or more storage devices, a public key, a secret key, and an erasure certificate number are associated with one another; and
    verify an authenticator transmitted from each of the two or more storage devices.

5. The system according to claim 1, wherein the first processor is configured to generate a public key and a secret key common in a predetermined unit.

6. The system according to claim 1, wherein the second processor is configured to transmit the erasure completion notification that further includes an erasure location.

7. The system according to claim 1, wherein the second processor is configured to erase the data when receiving a data erasure preparation command and further receiving a data erasure command.

8. A server device for verifying erasure completion of storage devices, the server device comprising:
    a memory storing verification information; and
    a processor configured to:
        accept a request to transmit a certificate number indicating a number for identifying an erasure certificate;
        generate information in which identification information of one of the storage devices from which data is to be erased, a public key, a secret key, and the certificate number are associated with one another;
        transmit the certificate number;
        verify whether an erasure completion notification transmitted by the one storage device is appropriate by using an authenticator transmitted by the one storage device and the verification information, the erasure completion notification including the certificate number and the identification information, and the authenticator being generated by using verification information for the one storage device;

generate, in response to the erasure completion notification being appropriate, the erasure certificate that includes the erasure completion notification and is signed by using the secret key; and transmit the erasure certificate.

9. The server device according to claim 8, wherein the processor is configured to generate the erasure certificate further including a time based on a time at which the request to transmit the certificate number is made.

10. The server device according to claim 8, wherein when a request is made to put together two or more storage devices to be erased of the storage devices, the processor is configured to:

generate information in which identification information of the two or more storage devices, a public key, a secret key, and an erasure certificate number are associated with one another; and verify an authenticator transmitted from each of the two or more storage devices.

11. The server device according to claim 8, wherein the processor is configured to generate a public key and a secret key common in a predetermined unit.

12. The server device according to claim 8, wherein the processor is configured to generate the erasure certificate that further includes a time at which the erasure certificate is generated.

13. The server device according to claim 8, wherein the processor is configured to generate the erasure certificate that further includes an erasure location.

* * * * *